United States Patent Office 3,057,908

Patented Oct. 9, 1962

1

3,057,908

PROCESS FOR PREPARING HIGH MOLECULAR LINEAR POLYESTERS FROM POLYMETHYLENE GLYCOLS AND ESTERS OF BENZENE DICARBOXYLIC ACIDS

Hans Grusclike, Bad Soden am Taunus, and Heinz Medem, Offenbach am Main, Germany, assignors to Farbwerke Hoechst Aktiengesellschaft vormals Meister Lucius & Bruning, Frankfurt am Main, Germany, a corporation of Germany No Drawing. Filed Nov. 12, 1958, Ser. No. 773,180
Claims priority, application Germany June 24, 1955
4 Claims. (Cl. 260—475)

This application is a continuation-in-part application of application Serial No. 590,086 filed June 8, 1956.

It has already been proposed to prepare polyesters from diols and aromatic dicarboxylic acids by reacting a diol with an ester from a dicarboxylic acid and a monohydric alcohol in the presence of a catalyst, the diols being used in excess.

As catalysts it has been proposed to use metals, such as sodium, potassium, lithium, calcium, magnesium, zinc, cadmium, manganese, iron, cobalt, nickel, tin, lead and bismuth as well as the carbonates, oxides and alcoholates of alkaline and alkaline earth metals either alone or in combination.

In U.S. Patent 2,470,651 zinc chloride, aluminum chloride, antimony chloride, antimony fluoride and boron fluoride are used as catalyst which must be added in great amounts (up to 1 mol percent) to produce any effect whatsoever.

As catalysts there may also be used the oxides, chlorides, sulfates, acetates, alcoholates and salts of higher aliphatic or aromatic monocarboxylic acids of the elements of the third, fourth and second sub-group of the periodic system, which are added in a relatively high proportion (up to 0.5 mol percent).

Now we have found that high molecular linear polyesters, such as polyethylene terephthalate, can be obtained by reacting a diol and an ester of a dicarboxylic acid with a monohydric alcohol in the presence of an alkaline and/or alkaline earth metal salt of silicic acid, stannic acid, selenic acid, phosphoric acid and tungstic acid or mixtures thereof in a proportion of 0.005 to 0.05 mol percent, calculated upon the dicarboxylic acid ester used. The process of this invention offers the particular advantage of enabling a considerably smaller proportion of catalyst to be used than in the known processes.

It has also been found that the aforesaid salts or salt mixtures used as catalyst may be replaced by compounds such as manganese phosphate, zinc phosphate or tin phosphate alone or in admixture with one another. The addition of antimony oxide to one of the aforesaid phosphates or a mixture thereof has a very favorable effect. The phosphates referred to above or their mixtures are used like the alkali metal salts or alkaline earth metal salts of the above mentioned acids in a proportion of between about 0.005 mol% and 0.05 mol%, calculated upon the benzene dicarboxylic acid ester used.

Especially valuable catalysts are manganese phosphate, mixtures of manganese phosphate and antimony oxide, or mixtures of manganese phosphate, antimony oxide and zinc acetate.

The process of this invention can be carried out with advantage by adding the catalysts, prior to the re-esterification, to the esters and diols to be condensed. As esters of dicarboxylic acid there may be used esters of terephthalic acid, isophthalic acid, phthalic acid, sebacic acid, adipic acid, succinic acid with monohydric alcohols containing 1 to 6 carbon atoms, such as methyl alcohol, butyl alcohol or isohexyl alcohol. As diols are concerned, for example, ethylene glycol, propylene glycol, butane-1.4-diol or hexane-diol. The reaction mixture is heated under normal conditions, for example at 120 to 300° C., so that the alcohol separated from the reaction mixture is withdrawn from the reaction zone. The products obtained in the first reaction zone, i.e. the diol esters of terephthalic acid, can be converted in the usual manner into high molecular fiber-forming products, as it is described for example in German Patent 818,117.

2

The following examples serve to illustrate the invention but they are not intended to limit it thereto:

*Example 1*

150 grams of dimethylterephthalate, 120 grams of ethylene glycol and 0.06 gram of manganese phosphate are heated to 190° C., while stirring, with distillation of methanol. The separated methyl alcohol has distilled over after 6 hours, during which time the interior temperature is slowly increased to 210° C. The reaction mixture is then introduced into a vacuum-tight vessel provided with a gas supply line, a stirrer and a descending cooler with a receiver, and while injecting nitrogen, the temperature of the oil bath is kept at 250° C. and the vacuum prevailing in the vessel is adjusted within 2½ hours from 760 mm. to a complete vacuum (0.3 mm.). The oil bath is heated to 278° C. and kept at that temperature for 3 hours during which time the reaction mass becomes increasingly viscous. The melt so produced enables the production of fibers which are capable of being stretched subsequently.

*Example 2*

150 grams of dimethylterephthalate and 120 grams of ethylene glycol are mixed with 0.05 gram of manganese phosphate and 0.02 gram antimony oxide. The reaction mixture so obtained is condensed as described in Example 1. The resulting product has a K-value of about 55, determined in a mixture of phenol and tetrachlorethane. The molten product can be spun into fibers which, after having been stretched, exhibit very good tensile strength.

*Example 3*

200 grams of di-n-butylterephthalate and 112 grams of glycol are mixed with a mixture consisting of 0.04 gram of manganese phosphate, 0.01 gram of antimony oxide and 0.01 gram of zinc acetate and the resulting reaction mixture is condensed as described in Example 1.

The final product obtained is distinguished by its especially clear color and has the K-value 55, determined in a mixture of phenol and tetrachlorethane. The fibers produced from the melt so obtained are capable of being stretched subsequently.

We claim:

1. The method of making diol esters of terephthalic acid by an ester interchange reaction, said esters being adaptable to condensation to form high molecular weight linear polyesters, which process comprises heating (1) a polymethylene glycol containing from 2 to 6 carbon atoms and (2) an ester of terephthalic acid with a monohydric alcohol containing from 1 to 6 carbon atoms, in the presence of 0.005 to 0.05 mol percent, calculated on said terephthalic acid ester, of (3) a catalyst selected from the group consisting of manganese phosphate, mixtures of a major portion of manganses phosphate with a balance of antimony trioxide, and mixtures of a major portion of manganese phosphate with a balance of antimony trioxide and zinc acetate, at a temperature sufficient to distill off monohydric alcohol formed by said reesterification and until said monohydric alcohol has distilled off.

2. A process as claimed in claim 1, wherein the reaction is carried out in the presence of a mixture of manganese phosphate and antimony oxide as catalyst.

3. A process as claimed in claim 1, wherein the reaction is carried out in the presence of mixtures of manganese phosphate, zinc acetate and antimony oxide as catalyst.

4. A process as claimed in claim 1, wherein said catalyst is manganese phosphate.

References Cited in the file of this patent

UNITED STATES PATENTS

| | | |
|---|---|---|
| 2,249,950 | Fuller | July 22, 1941 |
| 2,465,319 | Whinfield et al. | Mar. 22, 1949 |
| 2,641,592 | Hofrichter | June 9, 1953 |
| 2,681,360 | Vondonik | June 14, 1954 |

FOREIGN PATENTS

| | | |
|---|---|---|
| 792,011 | Great Britain | Mar. 19, 1958 |